United States Patent Office 3,342,673
Patented Sept. 19, 1967

3,342,673
SOLVENT SYSTEM FOR FORMULATING CARBAMATES
Harold A. Kaufman, Piscataway Township, Middlesex County, and Edward J. Broderick, Edison, N.J., assignors to Mobil Oil Corporation, a corporation of New York
No Drawing. Filed Sept. 11, 1964, Ser. No. 395,889
9 Claims. (Cl. 167—42)

This application is concerned with the application of pesticides. It is more particularly related to an improved pesticide concentrate that can be diluted for commercial application.

As is well known to those familiar with the art, pesticides are usually applied in the form of solutions in organic solvents or in the form of aqueous emulsions, each containing about one or two percent carbamates by weight. Usually, pesticides are transported in the form of concentrated solutions for later dilution which remain substantially stable for application.

There have been proposed as pesticides certain carbamates such as 4-benzothienyl N-methylcarbamate and 1-naphthyl N-methylcarbamate. These carbamates are varied in degrees of biological activity and are useful as insecticides, fungicides, and the like. It has generally been difficult to find solvents for these carbamates which can be used to prepare concentrated solutions which can be diluted. Thus, for example, solutions of these carbamates in such good polar solvents as dioxane, dimethyl formamide, and tetrachloroethane cannot be diluted with a common solvent such as kerosene to a 1 or 2 percent solution, suitable for application, without precipitation of the carbamate. Likewise, dilution of acetone concentrates of these carbamates cannot be effected with water without precipitation. It is to be noted that precipitation occurs even though these solvents, by themselves, are readily soluble in the diluent or extending agent. It is greatly to be desired to have a solvent for the carbamate pesticides which can be diluted without undesirable precipitation of the carbamate. It is more desirable to have a solvent that can be diluted with either water or a non-polar solvent.

There has now been found a class of solvents for concentrates of carbamate pesticides that can be readily diluted with water or non-polar solvents without precipitation of the carbamate from the solvent. It has been discovered that such concentrates can be prepared using a certain class of amides, as hereinafter defined, as the solvent.

Accordingly, it is a broad object of this invention to provide concentrates of carbamate pesticides. Another object is to provide concentrates of carbamate pesticides that can be readily diluted with water and with non-polar solvents. A specific object is to provide concentrates of carbamate pesticides in certain amide solvents which can be readily diluted with water and with non-polar solvents without precipitation of carbamate. Other objects and advantages of this invention will become apparent to those skilled in the art, from the following detailed description.

In general, this invention provides dilutable concentrates of carbamate pesticides dissolved in an amide having the structural formula:

wherein R and R' are selected from the group consisting of hydrogen and alkyl groups having 1 to 4 carbon atoms and R" is an aliphatic group containing between about 5 and about 17 carbon atoms or a cycloaliphatic group containing 3 to 6 carbon atoms.

The amides utilizable as solvents in this invention are compounds and mixtures of compounds having the formula:

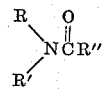

wherein R and R' are hydrogen or alkyl groups having 1 to 4 carbon atoms and R" is an aliphatic group having between about 5 and 17 carbon atoms or an alicyclic group having 3–6 carbon atoms. In the usual practice of this invention, the amide solvent will be normally liquid at room temperature (about 20–25° C.), so that the concentrated solution of carbamate can be readily dispersed in water to form an emulsion. It is contemplated, however, to use a normally solid amide (e.g. a stearamide), wherein the carbamate would be in solid solution that can be dissolved in a non-polar solvent, such as kerosene, to produce a dilute solution for application. The preferred solvents for purposes of this invention are those wherein R and R' are methyl groups and R" together with the carbonyl radical is derived from caproic or oleic acid. Accordingly, the preferred solvents are N,N-dimethyl caproamide, N,N-dimethyl caprylamide and N,N-dimethyl oleamide. Non-limiting examples, of other suitable solvents are N,N-dimethyl-2-ethylhexanoamide, N-butyl capramide, N,N-dipropyl capramide, N-methyl-N-propyl lauramide, N,N-dimethyl lauramide, N-ethyl myristamide, N,N-dimethyl palmitamide, N,N-dimethyl margaramide, N-butyl oleamide, N-methyl stearamide, N,N-dimethyl cyclopropanoamide, and N,N - dimethyl cyclohexanoamide. These amides can be readily prepared by means well known in the art, such as by reacting the corresponding acyl halide with a primary or secondary amine. Indeed, many of this class of amides are readily available commercially.

The carbamate pesticides contemplated for solution in the amide solvents are carbamates having the formula:

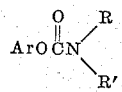

wherein Ar is an aromatic or heterocyclic group and R and R' are hydrogen or methyl. The aromatic and heterocyclic groups can be various mononuclear and polynuclear materials such as phenyl, benzothienyl, naphthyl, benzofuryl, and o-isopropoxyphenyl.

The aromatic group, Ar, can contain various substituent groups such as halo, nitro, amino, and alkyl groups. Typical pesticides that are contemplated for use in the present invention are disclosed in U.S. Patents Nos. 2,903,478, 3,060,225, and in co-pending application, Ser. No. 334,581, filed Dec. 30, 1963, now abandoned.

In the usual practice, the carbamate pesticide is dissolved as a concentrate in the amide solvent in amounts varying between about 5 percent by weight and about 40 percent by weight. In preferred practice, the concentrates of carbamate in the solvent will be between 10 percent weight and about 32 percent weight.

In the case wherein the concentrate is to be emulsified with water, the stability of the emulsion can be further improved by including anionic or nonionic surface-active agents, although in many cases the emulsion is sufficiently stable without the use of such agents. Suitable surface-active agents are polyoxyethylene sorbitan monolaurate, polyoxyethylene sorbitan mono-oleate, diethylene glycol laurate, and calcium and amino sulfonate salts. If a surface-active agent is used, and it is not essential, it will be used at a concentration of 1 to 10 weight percent of the final concentrate.

The following examples are for the purpose of illustrating the concentrates of this invention and to demonstrate their extendability. It must be strictly understood that the invention is not to be limited to these examples, as a wide variety of other amide solvents and carbamate pesticides are utilizable, as described hereinbefore. In the examples, all parts are by weight.

*Example 1*

A concentrate solution was made of 10 parts 4-benzothienyl N-methylcarbamate dissolved in 90 parts N,N-dimethyl caproamide. Another concentrate solution was made from 15 parts 1-naphthyl N-methylcarbamate dissolved in 85 parts N,N-dimethyl caproamide. Each of these concentrates was readily diluted to solutions in nonpolar solvents, such as kerosene, having a carbamate weight concentration of 1 percent and 2 percent. No precipitation of the carbamate occurred.

*Example 2*

Two emulsifiable concentrates were prepared as follows:

[a]

| | Parts |
|---|---|
| Technical 4-benzothienyl N-methylcarbamate | 3 |
| N,N-dimethyl caprylamide | 6.3 |
| Polyoxyethylene sorbitan monolaurate | 0.35 |
| Calcium and amino sulfonate salt mixture | 0.35 |

[b]

| | Parts |
|---|---|
| 1-naphthyl N-methylcarbamate | 2.3 |
| N,N-dimethyl caprylamide | 7.0 |
| Polyoxyethylene sorbitan monolaurate | 0.35 |
| Calcium and amino sulfonate salt mixture | 0.35 |

Each concentrate was diluted to 1 percent with water without precipitation of carbamate and with the formation of stable emulsion.

*Example 3*

A concentrate was made of 10 parts 4-benzothienyl N-methylcarbamate and 90 parts N,N-dimethyl oleamide. The concentrate was diluted with kerosene to produce a solution containing one percent carbamate, by weight. No precipitation of carbamate occurred.

*Example 4*

A concentrate was made of 30 parts 4-benzothienyl N-methylcarbamate and 70 parts mixture of amides containing 50 weight percent, N,N-dimethyl caprylamide, 40 weight percent N,N-dimethyl capramide, 5 weight percent N,N-dimethyl lauramide, and 5 weight percent N,N-dimethyl caproamide. The concentrate was diluted with water to form a stable emulsion containing one weight percent carbamate. No precipitation of carbamate occurred.

*Example 5*

A concentrate was made of 23 parts 1-naphthyl N-methylcarbamate and 77 parts mixture of amides containing 50 weight percent N,N-dimethyl caprylamide and 40 weight percent N,N-dimethyl capramide, 5 weight percent N,N-dimethyl lauramide, and 5 weight percent N,N-dimethyl caproamide. The concentrate was diluted with water to form a stable emulsion containing one weight percent carbamate. No precipitation of carbamate occurred.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:
1. A dilutable concentrate of a carbamate pesticide comprising between about 5 percent and about 40 percent, by weight of said concentrate of a carbamate pesticide dissolved in an amide having the formula:

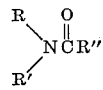

wherein R and R' are selected from the group consisting of hydrogen and alkyl groups having 1 to 4 carbon atoms and R'' is an aliphatic group containing between about 5 and about 17 carbon atoms.

2. The concentrate defined in claim 1 wherein said carbamate pesticide has the formula:

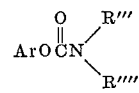

wherein Ar is selected from the group consisting of aromatic groups and heterocyclic groups and R''' and R'''' are selected from the group consisting of hydrogen and methyl.

3. The concentrate defined in claim 2 wherein said carbamate pesticide is 4-benzothienyl N-methylcarbamate.

4. The concentrate defined in claim 2 wherein said carbamate pesticide is 1-naphthyl N-methylcarbamate.

5. A dilutable concentrate comprising between about 10 percent and about 32 percent, by weight of the concentrate, of 4-benzothienyl N-methylcarbamate dissolved in N,N-dimethyl caproamide.

6. A dilutable concentrate comprising between about 10 percent and about 32 percent, by weight of the concentrate, of 4-benzothienyl N-methylcarbamate dissolved in N,N-dimethyl caprylamide.

7. A dilutable concentrate comprising between about 10 percent and about 32 percent, by weight of the concentrate, of 4-benzothienyl N-methylcarbamate dissolved in N,N-dimethyl oleamide.

8. A dilutable concentrate comprising between about 10 percent and about 32 percent, by weight of the concentrate, of 4-benzothienyl N-methylcarbamate dissolved in a mixture of amides containing, by weight about 5 percent N,N-dimethyl caproamide, about 50 percent N,N-dimethyl caprylamide, about 40 percent N,N-dimethyl capramide, and about 5 percent N,N-dimethyl lauramide.

9. A dilutable concentrate comprising between about 10 percent and about 32 percent, by weight of the concentrate, of 1-naphthyl N-methylcarbamate dissolved in a mixture of amides containing, by weight, about 5 percent N,N-dimethyl caproamide, about 50 percent N,N-dimethyl caprylamide, about 40 percent N,N-dimethyl capramide, and about 5 percent N,N-dimethyl lauramide.

References Cited

UNITED STATES PATENTS

| 2,903,478 | 9/1959 | Lambrech | 260—479 |
| 3,060,225 | 10/1962 | Shulgin | 260—479 |

FOREIGN PATENTS 638,684  4/1964  Belgium.

OTHER REFERENCES

Chemical and Engineering News, 39, pages 64 to 65, Mar. 13, 1961.

"Hallocomids" C.P. Hall Co., Chicago, Illinois, 21 pages, brochure (June 28, 1961), (pages 1 to 8, 11 to 15, 19 and 19A relied on).

LEWIS GOTTS, *Primary Examiner.*

SHEP K. ROSE, *Assistant Examiner.*